United States Patent [19]

Obermair

[11] Patent Number: 5,325,033
[45] Date of Patent: Jun. 28, 1994

[54] CIRCUIT ARRANGEMENT FOR INFLUENCING THE START-UP AND/OR BRAKING BEHAVIOR OF THREE-PHASE A.C. NON-SYNCHRONOUS MOTORS

[76] Inventor: Herbert Obermair, Dambach 34, A-4501 Neuhofen/Krems, Austria

[21] Appl. No.: 934,675

[22] PCT Filed: Jan. 7, 1992

[86] PCT No.: PCT/AT92/00001
§ 371 Date: Sep. 4, 1992
§ 102(e) Date: Sep. 4, 1992

[87] PCT Pub. No.: WO92/12570
PCT Pub. Date: Jul. 23, 1992

[30] Foreign Application Priority Data
Jan. 8, 1991 [AT] Austria ................. A23/91

[51] Int. Cl.$^5$ ............................................. H02P 1/26
[52] U.S. Cl. ........................... 318/757; 318/778; 318/430; 318/501; 318/519
[58] Field of Search .............. 318/101, 104, 757, 759, 318/375, 379, 430, 501, 519, 778; 310/68 E, 191, 209

[56] References Cited

U.S. PATENT DOCUMENTS

| | | | |
|---|---|---|---|
| 2,959,721 | 11/1960 | Butler et al. | 318/211 |
| 4,311,948 | 1/1982 | Brown et al. | 318/759 |
| 4,843,292 | 6/1989 | Ono et al. | 318/606 |
| 4,990,837 | 2/1991 | Ishitobi | 318/375 |
| 5,138,242 | 8/1992 | Kim et al. | 318/501 |

FOREIGN PATENT DOCUMENTS

| | | |
|---|---|---|
| 692297 | 6/1940 | Fed. Rep. of Germany. |
| 3631298 | 3/1988 | Fed. Rep. of Germany. |
| 3832149 | 9/1988 | Fed. Rep. of Germany. |

OTHER PUBLICATIONS

Patent Abstract of Japan vol. 8, No. 119 (JP, A59 32372).

*Primary Examiner*—William M. Shoop, Jr.
*Assistant Examiner*—Brian Sircus
*Attorney, Agent, or Firm*—Collard & Roe

[57] ABSTRACT

In a circuit arrangement for influencing the start-up and/or braking behavior of three-phase a.c. non-synchronous motors having phase windings (5, 6, 7), which are connected in star for continuous operation and have terminals for the phase conductors (1, 2, 3) and for a neutral conductor (4) the phase terminal of one phase winding (6, 7) is connected by a change-over switch (9, 11) to the neutral conductor (4) for start-up and/or braking. A corresponding circuit arrangement is disclosed also for three-phase a.c. non-synchronous machines in which the phase windings (5, 6, 7) have terminals for the phase conductors (1, 2, 3) and for a neutral conductor (4).

8 Claims, 1 Drawing Sheet

FIG. 1
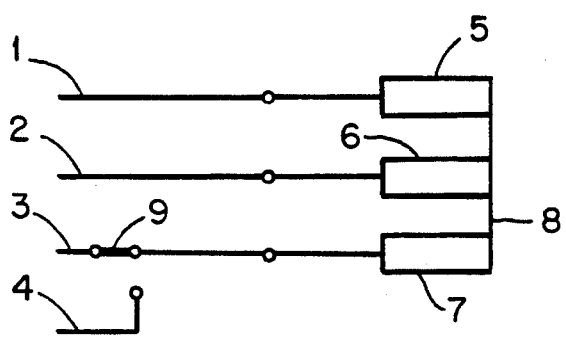
FIG. 2
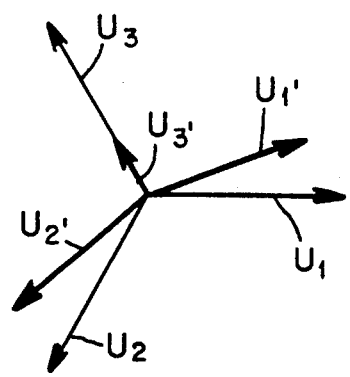
FIG. 3
FIG. 4
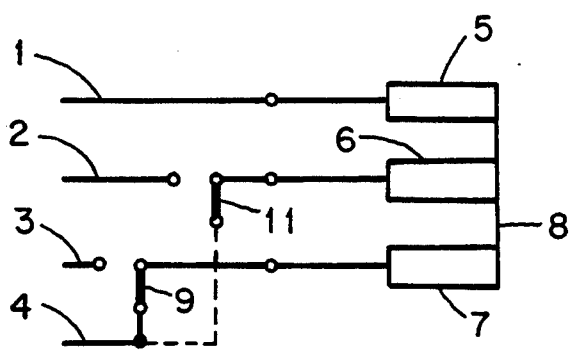

CIRCUIT ARRANGEMENT FOR INFLUENCING THE START-UP AND/OR BRAKING BEHAVIOR OF THREE-PHASE A.C. NON-SYNCHRONOUS MOTORS

This invention relates to a circuit arrangement for influencing the start-up and/or braking behavior of three-phase a.c. non-synchronous motors having phase windings which in a first embodiment are connected in star for continuous operation and have terminals for the phase conductors and for a neutral conductor whereas in a second embodiment the phase windings have terminals for the phase conductor and for a neutral conductor.

The invention particularly relates to circuit arrangements for gear-brake motors for machines, production plants, conveyor plants and lifting equipment. Change-pole motors are often used for such purposes. It is known to connect non-synchronous machines in series with various choke circuits for influencing the start-up and/or braking behavior. In special cases one and the same motor may be provided with different choke circuits for start-up and braking. Circuit arrangements of the present kind are required to avoid sudden accelerations and decelerations of the driven parts and knocks in the drive train, which might occur if there is a backlash in the drive train and the drive train in stressed for braking and/or for driving. Known choke circuits for the phases windings may comprise, e.g., resistors that can be connected in circuit or disconnected. Other choke and control circuits are known for non-synchronous machines having rotor windings which can be connected by slip rings to a control circuit. Such a design is more expensive than machines having a short-circuit rotor. In order to provide desirable dynamic characteristics during start-up and braking, additional flywheel masses, such as fans having a high mass, are often used although they involve other disadvantages, particularly a poorer acceleration and deceleration of the drive train.

It is an object of the invention to avoid the disadvantages which have been pointed out and to provide circuit arrangements which in both embodiments mentioned hereinbefore permit an effective influence on the start-up and/or braking behavior to be exerted with simple means.

In the first embodiment the object set forth is accomplished by the invention in that the phase terminal of one phase winding is connected by a change-over switch to the neutral conductor for start-up and/or braking. In the second embodiment the object set forth is accomplished in that the phase windings are connected for continuous operation in star at a star point which is disconnected from only one phase winding, which is permanently connected to the associated phase conductor and the neutral conductor, and the phase terminal of one of the two other phase windings connected at the star point is connected by a change-over switch to the neutral conductor for start-up and/or braking.

Both embodiments are particularly intended for use with machines having a short-circuit rotor. In spite of the connection to only two phase conductors or to only one phase conductor, the mutual influence of the windings and the influence exerted via the rotor cause a rotating field to be generated, which results in a lower start-up torque or during an oversynchronous braking results in a lower braking torque compared to the normal operation. In the first embodiment the voltages in the two phase windings connected to the phase conductors are displaced in phase and the voltage in the third phase winding is not displaced in phase but is much lower. Calculations have shown that the voltages in the two phase windings connected to phase conductors are about 88.2% of the voltages obtained in a normal star connection and the voltage in the third phase winding is 33.3% of the normal phase voltage. At the beginning of the start-up operation the currents in the several phase windings exhibit similar changes. As a result, the rotating field which is generated is elliptical rather than circular and throughout the speed range the torque is one-third of the torque obtained with a normal star connection.

During an oversynchronous operation of change-pole motors the torque may further be reduced in that one or two of the three phase windings connected at the star point are selectively connected by the change-over switch to the neutral conductor. If only one phase winding is connected to the neutral conductor and the phase terminal of the second phase winding is disconnected, the torque will be reduced further.

In the second embodiment mentioned hereinbefore, one phase winding is permanently connected to the associated phase conductor and to the neutral conductor and thus remains connected to the full phase voltage so that the connection of one other phase winding to the neutral conductor results in a torque which is higher than that obtained in the correspondingly switched state of the first embodiment, in which the phase windings are permanently connected in star.

All circuit variants may be operated without a need for connecting or disconnecting external control elements, such as series resistors, impedances, and the like.

All said circuits involve only a low structural expenditure because it is possible in most cases to leave the feeding circuits for two phase windings unchanged relative to the normal operation in star.

To avoid sudden accelerations and/or decelerations and an occurrence of knocks after the elimination of the backlash present in a drive train between the gearmotor and the load, it will be sufficient in most cases to operate the start-up circuit in accordance with the invention only for a short time. For an optimization in plants that comprise a plurality of motors, particularly gearmotors, the change-over switch may constitute a component of a control system for controlling a plurality of drive motors of a conveyor system or a lifting equipment and may be operable by remote control means, which for the start-up of the associated motor, which preferably consists of a gearmotor, holds the change-over switch only for an order of a fraction of a second in the state for establishing the start-up circuit and subsequently re-establishes the normal condition of the circuit, in which all phase windings are connected to the phase terminals. For normal gearmotors the start-up circuit may be maintained, e.g., for 0.2 second. A special advantage of the most simple circuit mentioned first hereinbefore resides in that the phase of the voltage in the phase winding which can selectively be connected to the neutral conductor has the same unit vector as the phase voltage so that no disturbance is to be feared in case of a change-over. In change-pole motors it is recommendable to maintain the braking circuit that has been selected throughout the oversynchronous braking.

According to a further feature applied to a change-pole non-synchronous machine the change-over switch for braking can be actuated jointly with a pole switch for changing the number of poles to connect the at least one phase winding to the neutral conductor for braking in conjunction with an increase of the number of poles so that the sudden increase of the deceleration which otherwise results from the increase of the number of poles will be reduced.

Further details and desirable further features of the invention are apparent from the following description of the drawing.

The subject matter of the invention is illustrated by way of example in the drawing, in which FIG. 1 is a simplified representation of a circuit arrangement in accordance with the invention. Only the connections of the phase windings of a three-phase a.c. non-synchronous machine having a short-circuit rotor are shown.

FIG. 2 is a vector diagram of the phase voltages in the circuit of FIG. 1. The vectors for the normal operation are represented by thin lines and those for the start-up circuit are represented by thick lines.

FIG. 3 illustrates another circuit arrangement in accordance with the invention in a representation which is similar to that of FIG. 1 and FIG. 4 illustrates a third circuit arrangement.

In all of FIGS. 1, 3, and 4 of the drawing the phase conductors are designated 1, 2, 3, the neutral conductor is designated 4 and the three main phase windings of a three-phase a.c. non-synchronous motor having a short-circuit rotor are designated 5, 6, and 7. It is assumed that a main switch connected in series with the illustrated phase conductors 1, 2, 3 and the neutral conductor 4 is associated with the motor in each case. That main switch, optionally together with the change-over switches included in the circuit arrangements in accordance with the invention and to be described hereinafter, can be actuated by remote control means if the motor consists, e.g., of a gearmotor and constitutes a component of a drive of a conveyor system, a lifting equipment or the like.

In the embodiment shown in FIG. 1 the three phase windings 5, 6, 7 are interconnected at the star point by jumpers 8 so that phase voltages $U_1$, $U_2$, $U_3$ having the same vector quantity will be applied to said phase windings when the main switch is closed. In the illustrative embodiment the phase conductor 3 includes a change-over switch 9, by which the phase winding 7 can be disconnected from the phase conductor 3 and connected to the neutral conductor 4. This will give rise to phase voltages $U_1'$, $U_2'$, $U_3'$. As is apparent from FIG. 2, $U_3'$ is in phase with $U_3$ and $U_1'$ and $U_3'$ have been displaced 19.1° in phase.

In the circuit shown in FIG. 3 the star point has been opened and only the two phase windings 6 and 7 are connected by a line 10. The phase winding 5 is connected at one end to the phase conductor 1 and at the other end to the neutral conductor 4. A change-over switch 9 can be actuated to disconnect the phase winding 7 from the phase conductor 3 and to connect it also to the neutral conductor 4 in order to reduce the start-up and decelerating torques of the machine.

The circuit shown in FIG. 4 is similar to that of FIG. 1. But in addition to the change-over switch 9 shown in FIG. 1 there is a further change-over switch 11, which can be actuated jointly with or independently of the switch 9. When only one of the two switches 9, 11 is in the state shown in FIG. 4, the conditions are the same as in the circuit of FIG. 1 when 4 is connected to 7. When the second switch is also switched to the state shown in FIG. 4, the two phase windings 6 and 7 are connected to the neutral conductor 4 rather than to the phases 2, 3 and said two phase windings 6, 7 connected in parallel are connected at the star point 8 in series to the phase winding 5, which is connected to the phase conductor 1. In that switched state the braking torque during over-synchronous braking is lower than in the switched state described hereinbefore. If the phase 2 is merely interrupted by the switch 11 but the phase winding 6 is not connected to the neutral conductor 4, as is indicated by the dotted line connecting the change-over switches 9 and 11, the braking torque will be reduced further.

The switches 9 and 11 may also be actuated by remote control means and, e.g., in case of change-pole motors, it will be possible for a start-up to switch only one of the two switches 9 or 11 to the illustrated state for a short time so as to connect the associated phase winding to the neutral conductor 4 whereas in case of an increase of the number of poles by the change-over switch for braking both switches 9 and 11 are switched to the state illustrated in FIG. 1.

I claim:

1. A circuit arrangement for influencing the operation of three-phase a.c. non-synchronous motors having phase windings which are connected in star for continuous operation and have terminals for the phase conductors and for a neutral conductor, characterized in that the phase terminal of one phase winding is connected by a change-over switch to the neutral conductor for operation of the motor.

2. A circuit arrangement according to claim 1, characterized in that one or two of the three phase windings connected at the star point are selectively connected by the change-over switch to the neutral conductor.

3. A circuit arrangement according to claim 1, wherein the operation is braking of the motor.

4. A circuit arrangement according to claim 3 for a change-pole non-synchronous motor, characterized in that the change-over switch for braking can be actuated jointly with a pole switch for changing the number of poles to connect the associated phase winding or the associated phase windings to the neutral conductor for braking in conjunction with an increase of the number of poles.

5. A circuit arrangement according to claim 1, wherein the operation is a start-up of the motor.

6. A circuit arrangement according to claim 5 characterized in that the change-over switch constitutes a component of a control system for controlling a plurality of drive motors of a conveyor system or a lifting equipment and is operable by remote control means, which for the start-up of the associated non-synchronous motor, holds the change-over switch only for an order of a fraction of a second in the state for establishing the start-up circuit, in which the phase winding or phase windings are connected to the neutral conductor, and subsequently re-establishes the normal condition of the circuit, in which all phase windings are connected to the phase terminals.

7. A circuit arrangement according to claim 6, wherein the motor is a gearmotor.

8. Circuit arrangement for influencing the operation of three-phase a.c. non-synchronous motors having phase windings which have terminals for the phase conductors and for a neutral conductor, characterized in that the phase windings are connected for continuous operation in star at a star point which is disconnected from only one phase winding, which is permanently connected to the associated phase conductor and the neutral conductor, and the phase terminal of one (7) of the two other phase windings connected at the star point is connected by a change-over switch to the neutral conductor for operation of the motor.

* * * * *